US010795071B2

(12) United States Patent
Lerman et al.

(10) Patent No.: US 10,795,071 B2
(45) Date of Patent: Oct. 6, 2020

(54) LUMINAIRE MODULE HAVING A LIGHT GUIDE WITH A REDIRECTING END-FACE

(71) Applicant: Quarkstar LLC, Las Vegas, NV (US)

(72) Inventors: Louis Lerman, Las Vegas, NV (US); Ferdinand Schinagl, North Vancouver (CA); Allan Brent York, Fort Langley (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 16/224,414

(22) Filed: Dec. 18, 2018

(65) Prior Publication Data

US 2019/0377121 A1 Dec. 12, 2019

Related U.S. Application Data

(63) Continuation of application No. 15/121,338, filed as application No. PCT/US2015/012881 on Jan. 26, 2015, now abandoned.
(Continued)

(51) Int. Cl.
*F21V 8/00* (2006.01)
*F21S 8/04* (2006.01)
(Continued)

(52) U.S. Cl.
CPC ............ *G02B 6/0031* (2013.01); *F21S 8/04* (2013.01); *F21V 7/0008* (2013.01);
(Continued)

(58) Field of Classification Search
CPC ........ F21S 8/04; F21V 7/0016; F21V 7/0025; F21V 7/0033; F21Y 2103/10;
(Continued)

(56) References Cited

U.S. PATENT DOCUMENTS

| 4,432,039 A | 2/1984 | Cibie |
| 6,014,192 A | 1/2000 | Lehureau |

(Continued)

FOREIGN PATENT DOCUMENTS

| WO | WO2002050590 | 6/2002 |
| WO | WO2012176352 | 12/2012 |

OTHER PUBLICATIONS

International Application No. PCT/US2015/012881, Notification of Transmittal of the International Search Report and the Written Opinion of the International Searching Authority, dated Apr. 7, 2015, 10 pages.

*Primary Examiner* — William J Carter
(74) *Attorney, Agent, or Firm* — Fish & Richardson P.C.

(57) ABSTRACT

A solid-state luminaire module includes one or more light-emitting elements (LEEs) arranged to provide light; and a light guide including a receiving end arranged to receive the light provided by the LEEs and an opposing end, a pair of opposing side surfaces extending along a length of the light guide to guide the received light in a forward direction to the opposing end, and a redirecting end-face located at the opposing end and configured to reflect the guided light—that reaches the opposing end—back into the light guide as return light, such that substantially all the return light impinges on the pair of opposing side surfaces at incident angles larger than a critical incidence angle and transmits through the pair of opposing side surfaces into the ambient as output light of the luminaire module, the output light to propagate in backward directions.

24 Claims, 9 Drawing Sheets

Related U.S. Application Data

(60) Provisional application No. 61/943,917, filed on Feb. 24, 2014.

(51) Int. Cl.
*F21V 7/00* (2006.01)
*F21Y 115/10* (2016.01)
*F21Y 103/10* (2016.01)

(52) U.S. Cl.
CPC ......... *G02B 6/0035* (2013.01); *G02B 6/0045* (2013.01); *G02B 6/0055* (2013.01); *G02B 6/0085* (2013.01); *F21Y 2103/10* (2016.08); *F21Y 2115/10* (2016.08)

(58) Field of Classification Search
CPC . F21Y 2115/10; G02B 6/0011; G02B 6/0001; G02B 6/0031; G02B 6/0045; G02B 6/0096

USPC .......................................................... 362/628
See application file for complete search history.

(56) References Cited

U.S. PATENT DOCUMENTS

| | | | |
|---|---|---|---|
| 6,646,813 B2* | 11/2003 | Falicoff | G02B 6/0035 359/641 |
| 6,910,783 B2 | 6/2005 | Mezei et al. | |
| 9,228,702 B2 | 1/2016 | Welten | |
| 2006/0050282 A1 | 3/2006 | De Lamberterie | |
| 2008/0158905 A1 | 7/2008 | Chuang et al. | |
| 2008/0259640 A1 | 10/2008 | Parker | |
| 2010/0246158 A1 | 9/2010 | Van Gorkom et al. | |
| 2013/0039050 A1* | 2/2013 | Dau | G02B 6/0045 362/218 |
| 2013/0039090 A1* | 2/2013 | Dau | F21S 8/04 362/551 |
| 2013/0201715 A1 | 8/2013 | Dau | |
| 2016/0018064 A1 | 1/2016 | Jurik et al. | |

* cited by examiner optional: 145 and/or 142b;
when 142b is absent, output light beams 152b, 152a', 152b", 152a''', etc., also are absent.

LUMINAIRE MODULE HAVING A LIGHT GUIDE WITH A REDIRECTING END-FACE

CROSS-REFERENCE TO RELATED APPLICATIONS

This application is a continuation of U.S. patent application Ser. No. 15/121,338, filed Aug. 24, 2016, which is a U.S. National Stage of International Application No. PCT/US2015/012881, filed Jan. 26, 2015, which claims benefit under 35 U.S.C. § 119(e)(1) of U.S. Provisional Application No. 61/943,917, filed on Feb. 24, 2014, the entire contents of which are incorporated by reference herein.

FIELD OF THE TECHNOLOGY

The present technology relates generally to solid-state luminaires, and more specifically to solid-state luminaire modules having a light guide with a redirecting end-face.

BACKGROUND

Light sources are used in a variety of applications, such as for providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources, such as light-emitting diodes (LEDs).

SUMMARY

The present technology relates to solid-state luminaires. According to a first aspect of the present technology, a luminaire module includes one or more light-emitting elements (LEEs) arranged to provide light; and a light guide including (i) a receiving end and an opposing end, the receiving end arranged to receive the light provided by the LEEs, (ii) a pair of opposing side surfaces extending along a length of the light guide between the receiving end and the opposing end, the light guide configured to guide the received light in a forward direction, along the length of the light guide to the opposing end of the light guide, and (iii) a redirecting end-face located at the opposing end and configured to reflect the guided light—that reaches the opposing end—back into the light guide as return light, such that substantially all the return light impinges on the pair of opposing side surfaces at incident angles larger than a critical incidence angle and transmits through the pair of opposing side surfaces into the ambient as output light of the luminaire module, the output light to propagate in backward directions.

Implementations of the first aspect may include one or more of the following features. In some implementations, substantially all the return light can be transmitted through the pair of opposing side surfaces during multiple bounces at the pair of the opposing side surfaces. In some implementations, the light guide is configured to guide the received light in a forward direction through total internal reflection (TIR) off the opposing side surfaces.

In some implementations, the light provided by the LEEs is in a first angular range, and a numerical aperture of the light guide is such that the light received from the LEEs in the first angular range can be guided by the light guide through TIR off the pair of opposing side surfaces. In other implementations, the disclosed luminaire module further includes one or more optical couplers. Here, the light provided by the LEEs is in a first angular range, the optical couplers are arranged to receive the light provided by the LEEs and redirect it to the receiving end of the light guide in a second angular range, and a numerical aperture of the light guide is such that the light received from the optical couplers in the second angular range can be guided by the light guide through TIR off the pair of opposing side surfaces.

In either of the foregoing implementations, the guided light that reaches the opposing end of the light guide can be in a third angular range, a configuration of the redirecting end-face can be such that return light generated by the redirecting end-face is in a first return angular range, and the first return angular range has substantially no overlap with the third angular range. Further, the return light in the first return angular range transmits through each of the pair of opposing side surfaces as output light in a first output angular range with a propagation direction having a component anti-parallel to the forward direction. Furthermore, the redirecting end-face comprises one or more sawtooth-shaped sections. In some cases, the sawtooth-shaped sections are symmetrical.

Moreover, the configuration of the redirecting end-face can be such that return light generated by the redirecting end-face is also in a second return angular range, and the second return angular range has substantially no overlap with the third angular range. Further, the return light in the second return angular range transmits through each of the pair of opposing side surfaces as output light in a second output angular range with a propagation direction having a component anti-parallel to the forward direction.

In some implementations, the redirecting end-face is coated with reflecting material. In some cases, the reflecting material has voids that allow light to transmit through the end face.

In some implementations, the pair of opposing side surfaces of the light guide are planar and parallel.

These and/or other advantages may be provided by luminaire modules that are relatively inexpensive to manufacture. For example, the luminaires may be composed of relatively few components. Moreover, the individual components may be formed from conventional optical materials (e.g., optical plastics such as acrylic polymers or polycarbonate) and/or by conventional techniques. The present technology can allow for more compact luminaire modules. Such modules may require less material, may be made smaller and lighter. As such, luminaire modules may require less volume which can help lower manufacturing and distribution cost.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE FIGURES

Like elements in different figures are identified with the same reference numeral.

DETAILED DESCRIPTION OF THE TECHNOLOGY

Figure 1A:
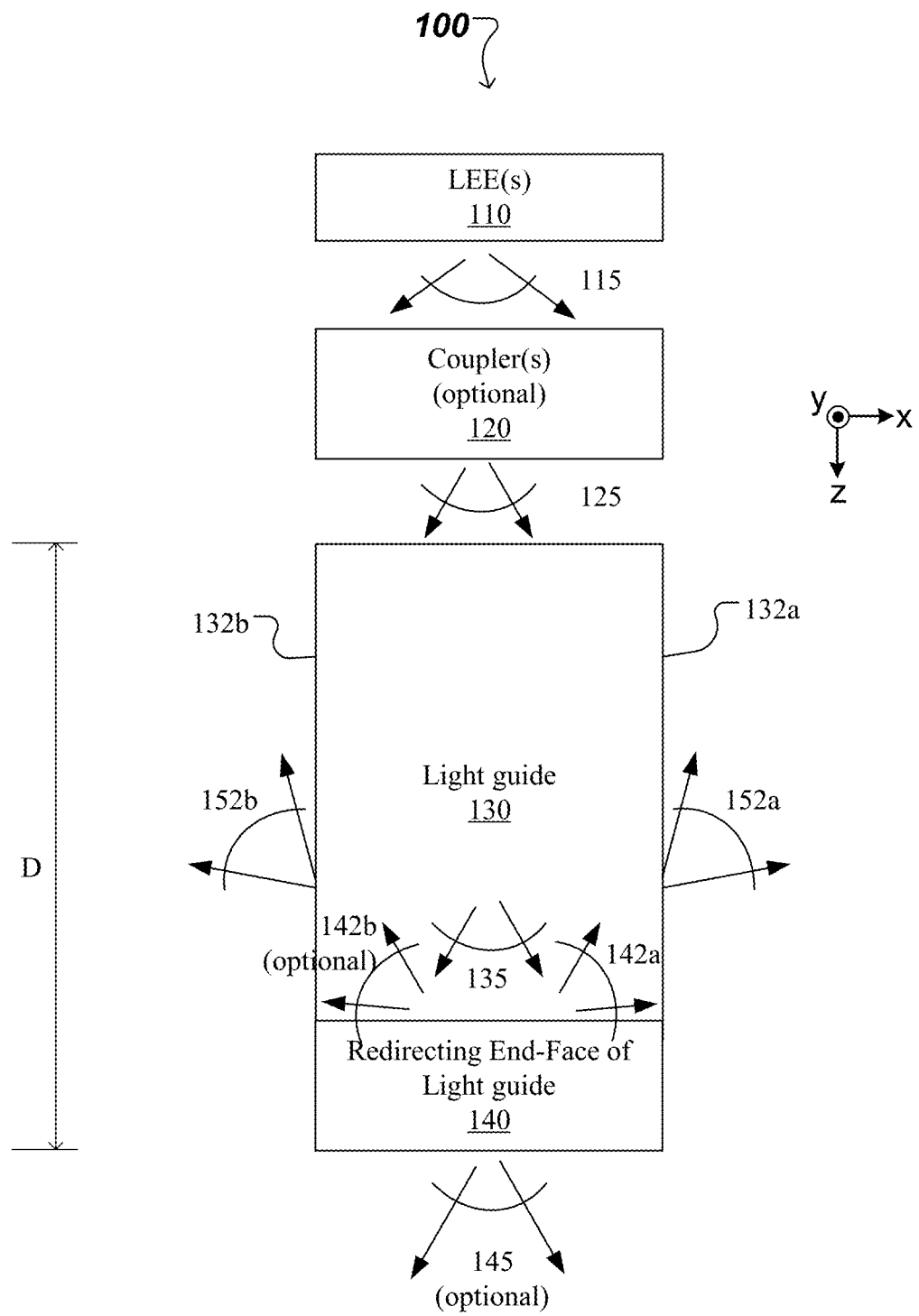
FIG. 1A illustrates a block diagram of a solid-state luminaire module having a light guide with a redirecting end-face.

FIG. 1 illustrates a block diagram of a solid-state luminaire module 100 that includes a light guide 130 with a redirecting end-face 140. In addition to the light guide 130, the luminaire module 100 includes one or more light emitting elements (LEEs) 110. In some implementations, the luminaire module 100 also includes one or more couplers 120.

In general, a LEE, also referred to as a light emitter, is a device that emits radiation in one or more regions of the electromagnetic spectrum from among the visible region, the infrared region and/or the ultraviolet region, when activated. Activation of a LEE can be achieved by applying a potential difference across components of the LEE or passing a current through components of the LEE, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. In some implementations, a LEE is a specific device that emits the radiation, for example a LED die. In other implementations, the LEE includes a combination of the specific device that emits the radiation (e.g., a LED die) together with a housing or package within which the specific device or devices are placed. Examples of LEEs include also lasers and more specifically semiconductor lasers, such as vertical cavity surface emitting lasers (VCSELs) and edge emitting lasers. Further examples of LEEs include superluminescent diodes and other superluminescent devices.

During operation, the LEEs 110 provide light within a first angular range 115. Such light can have a Lambertian distribution relative to the optical axes of the one or more LEEs 110 (e.g., the z-axis of the Cartesian reference system shown in FIG. 1.)

The light guide 130 is made from a solid, transparent material. The light guide 130 is arranged to receive the light provided by the LEEs 110 at one end of the light guide 130 and to guide the received light in a forward direction, e.g., along the z-axis, from the receiving end to an opposing end of the light guide 130. Here, a distance D between the receiving end of the light guide 130 and it opposing end can be 5, 10, 20, 50 or 100 cm, for instance. A combination of (i) an angular range in which the light is received by the light guide 130 at the receiving end and (ii) a numerical aperture of the light guide 130 is configured such that the received light is guided from the receiving end to the opposing end through reflection off of light guide side surfaces 132a, 132b of the light guide 130. Depending on the implementation, at least some, if not all, of this reflection is via total internal reflection (TIR). In some implementations, the numerical aperture of the light guide 130 is such that all light provided by the LEEs 110 in the angular range 115 can be injected directly into the light guide 130 at its receiving end.

In other implementations, the luminaire module 100 includes one or more couplers 120 to receive the light from the LEEs 110 within the first angular range 115 and provide light within a second angular range 125 to the receiving end of the light guide 130. The one or more couplers 120 are shaped to transform the first angular range 115 into the second angular range 125 via total internal reflection, specular reflection or both. As such, the one or more couplers 120 can include a solid transparent material for propagating light from an input end to an output end of each of the one or more couplers 120. Here, the divergence of the second angular range 125 is smaller than the divergence of the first angular range 115, such that all light provided by the couplers 120 in the angular range 125 can be injected into the light guide 130 at its receiving end. As used herein, providing light in an "angular range" refers to providing light that propagates in one or more prevalent directions in which each has a divergence with respect to the corresponding prevalent direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. (See, e.g., FIG. 3E-3F or 4E-4F.) Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

One or more of the light guide side surfaces 132a, 132b can be planar, curved or otherwise shaped. The light guide side surfaces 132a, 132b can be parallel or non-parallel. In embodiments with non-parallel light guide side surfaces 132a, 132b, a third angular range 135 of the guided light at the opposing end of the light guide 130 is different than the angular range 115 (when the light guide 130 receives the light directly from the LEEs 110) or 125 (when the light guide 130 receives the light from the couplers 120) of the light received at the receiving end. In embodiments with parallel light guide side surfaces 132a, 132b, the third angular range 135 of the guided light at the opposing end of the light guide 130 has at least substantially the same divergence as the angular range 115 (when the light guide 130 receives the light directly from the LEEs 110) or 125 (when the light guide 130 receives the light directly from the couplers 120) of the light received at the receiving end. Here, the light guide side surfaces 132a, 132b are optically smooth to allow for the guided light to propagate inside the light guide 130 through TIR.

Moreover, the light guide 130 has a redirecting end-face 140 at the opposing end. The redirecting end-face 140 of the light guide reflects at least some of the guided light—that reaches the opposite end—back into the light guide 130. The light reflected back into the light guide 130 by the redirecting end-face 140 is referred to as return light. The redirecting end-face 140 is configured to generate return light in a first return angular range 142a (and optionally a second return angular range 142b) such that, the return light can transmit at least in part through the light guide side surfaces 132a, 132b. Here, a portion of the return light transmitted through the light guide side surface 132a has a first output angular range 152a and another portion of the return light transmitted through the opposing light guide side surface 132b has a second output angular range 152b. As prevalent propagation direction of light in each of the first and second output angular ranges 152a, 152b has a component anti-parallel to the z-axis, the luminaire module 100 outputs light in the backward direction. Furthermore, the light guide 130 can be configured to allow multiple bounces of return light off of the light guide side surfaces 132a, 132b, with at least some transmission at one or more bounces. In some implementations, the intensity of the remaining return light proximate the receiving end of the light guide 130 is less than 5% of the intensity of the injected forward light. In some implementations, the total amount of return light extracted through the light guide side surfaces 132a, 132b is 90% or higher.

In some implementations, the guided light that reaches the opposite end of the light guide and is not reflected back into the light guide 130 as return light is transmitted through the redirecting end-face 140 in the forward direction (e.g., along the z-axis.) Here, the light transmitted through the redirecting end-face 140 in the forward direction has a third output angular range 145. In some implementations, the prevalent direction of propagation of light of the third output angular range 145 is substantially the same as that of the third angular range 135 of the guided light that reaches the opposing end of the light guide 130.

The redirecting end-face 140 can have macro-, meso- and/or microscopic surface structure as described below in connection with FIGS. 3A-3D and 4A-4D. Reflection at the redirecting end-face 140—e.g., the divergence of and the prevalent propagation direction within each of the first 142a and second 142b return angular ranges of the return light—can depend on shape and arrangement of the surface structure of the redirecting end-face 140. In some implementations, all or portions of the redirecting end-face 140 may be coated with a reflective material. For example, the coating can have reflectivity>99% such that substantially all light impinging on the redirecting end-face 140 is reflected back into the light guide 130 as return light. As another example, the coating can have 50% or 67% reflectivity such that $2/3^{rds}$ of the light impinging on the redirecting end-face 140 is reflected back into the light guide 130 as return light in the first and second return angular ranges 142a, 142b, and $1/3^{rd}$ of the light impinging on the redirecting end-face 140 is transmitted through it as forward output light in the third output angular range 145. In other implementations, the redirecting end-face 140 is uncoated. Here, the return light represents the remaining portion of refracted rays that does not transmit through the redirecting end-face 140 in forward direction, and instead reflects through Fresnel reflection caused by index mismatch between a refractive index of a material of the light guide 130 and a refractive index of the ambient. For example, for a pure, optically planar end-face 140 with a refractive index of the light guide of $n_{LG} \sim 1.5$ and that of the ambient of $n_{ambient} \sim 1.0$, about 4% or more of the light impinging on the redirecting end-face 140 is reflected back into the light guide 130 as return light in the first and second return angular ranges 142a, 142b, and up to about 96% of the light impinging on the redirecting end-face 140 is transmitted through it as forward output light in the third output angular range 145.

Figures 1B, 1C:
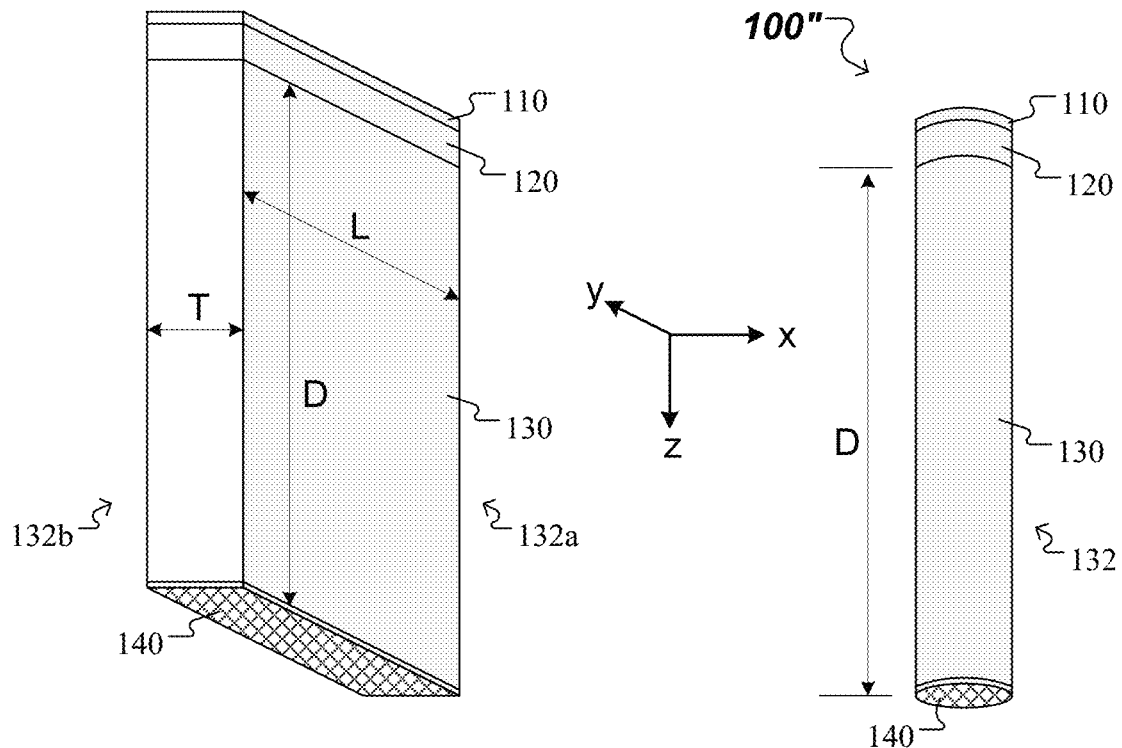
FIGS. 1B-1D are schematics of various embodiments of the luminaire module of FIG. 1.

FIG. 1B shows an embodiment 100' of the luminaire module—that includes a light guide 130 with a redirecting end-face 140—that is elongated along an axis (e.g., y-axis) perpendicular to the forward direction (e.g., along the z-axis.) In this case, a length L of the light guide 130 along the elongate dimension of the luminaire module 100' can be 2', 4' or 8', for instance. A thickness T of the light guide 130 orthogonal to the elongated dimension L (e.g., along the x-axis) is chosen to be a fraction of the distance D traveled by the guided light from the receiving end to the opposing end of the light guide 130. For T=0.05 D, 0.1 D or 0.2 D, for instance, light from multiple, point-like LEEs 110—distributed along the elongated dimension L—that is edge-coupled into the light guide 130 at the receiving end can efficiently mix by the time it propagates to the opposing end. In some implementations surfaces 132, 132a/b of the light guide may have a non-planar shape and/or a non-parallel arrangement to support mixing of light from multiple point-like LEEs 110.

FIG. 1C shows an embodiment 100" of the luminaire module—that includes a light guide 130 with a redirecting end-face 140—that has a (e.g., continuous) rotational symmetry about the forward direction (e.g., z-axis.) Here, a diameter of the light guide 130 is a fraction of the distance D traveled by the guided light from the receiving end to the opposing end of the light guide 130. For example, the diameter of the light guide 130 can be 0.05 D, 0.1 D or 0.2 D, for instance.

Figure 1D:
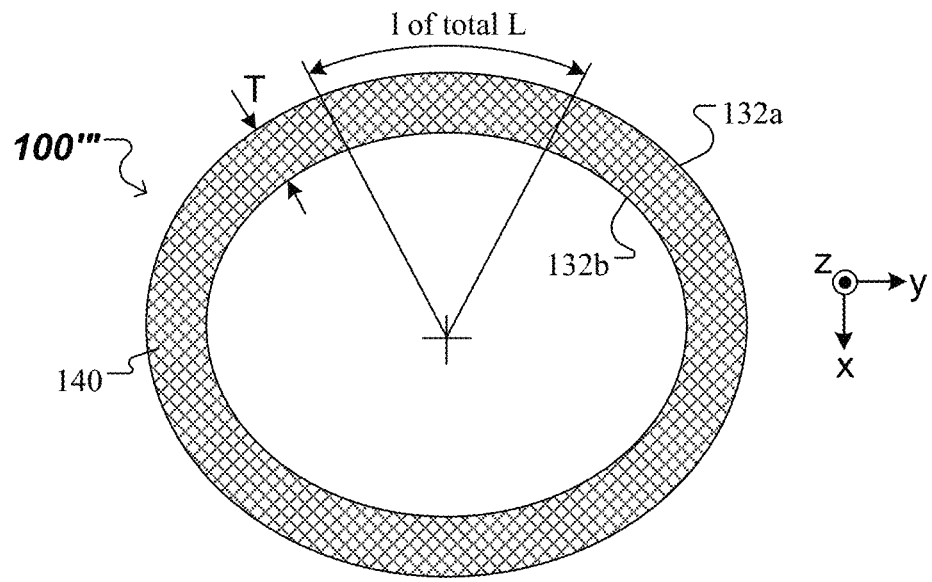

Other symmetry or asymmetry about the forward direction of the disclosed luminaire module is possible. FIG. 1D shows an embodiment 100''' of the luminaire module—that includes a light guide 130 with a redirecting end-face 140—for which the light guide 130 has two opposing side surfaces 132a, 132b that form a cylinder shell of thickness T. In the example illustrated in FIG. 1D, the x-y cross-section of the cylinder shell formed by the opposing side surfaces 132a, 132b is oval. In other cases, the x-y cross-section of the cylinder shell can be circular or can have other shapes. Some implementations of the example luminaire module 100' or 100''' may include a specular reflective coating on surface 132b.

The number of LEEs 110 of the luminaire module 100' or 100''' generally depends, inter alia, on the length L, where more LEEs are used for longer luminaire modules. In some implementations, the number of LEEs 110 can include between 10 and 1,000 LEEs (e.g., about 50 LEEs, about 100 LEEs, about 200 LEEs, about 500 LEEs). Generally, the density of LEEs (e.g., number of LEEs per unit length) also depends on the nominal power of the LEEs and luminance desired from the luminaire module. For example, a relatively high density of LEEs can be used in applications where high luminance is desired or where low power LEEs are used. In some implementations, the luminaire module 100' or 100''' has LEE density along its length of 0.1 LEE per centimeter or more (e.g., 0.2 per centimeter or more, 0.5 per centimeter or more, 1 per centimeter or more, 2 per centimeter or more). In some implementations, LEEs can be evenly spaced along the length, L, of the luminaire module. In some implementations, a heat-sink can be attached to the LEEs 110 to extract heat emitted by the LEEs. The luminaire module 100", for example, can include one or more LEEs. Luminaire modules in general can include one or multiple types of LEEs, for example one or more subsets of LEEs in which each subset can have different color or color temperature.

In luminaire modules that include a light guide 130 with a redirecting end-face 140, and multiple point-like LEEs 110, the distance D through which edge-coupled light propagates through the light guide 130 in the forward direction (e.g., along the z-axis) may be based on the amount of mixing required to provide desired uniformity of certain aspects of the light output (e.g., in one or more output angular ranges 152a, 152b, 145) by the luminaire modules. Here, the embodiments 100', 100" and 100''' of the disclosed luminaire module provide for mixing of both the forward guided light and the return light. As such, the embodiments 100', 100" and 100''' of the disclosed luminaire module can allow for shorter distance D through the light guide 130 as the return of forward light at end face 140 extends the optical path of the return light over that of the forward light. This can allow for better mixing which in turn can aid uniformity of color and fewer hot spots in the backward output light compared to that of forward output light (if any), for example.

Figure 2:
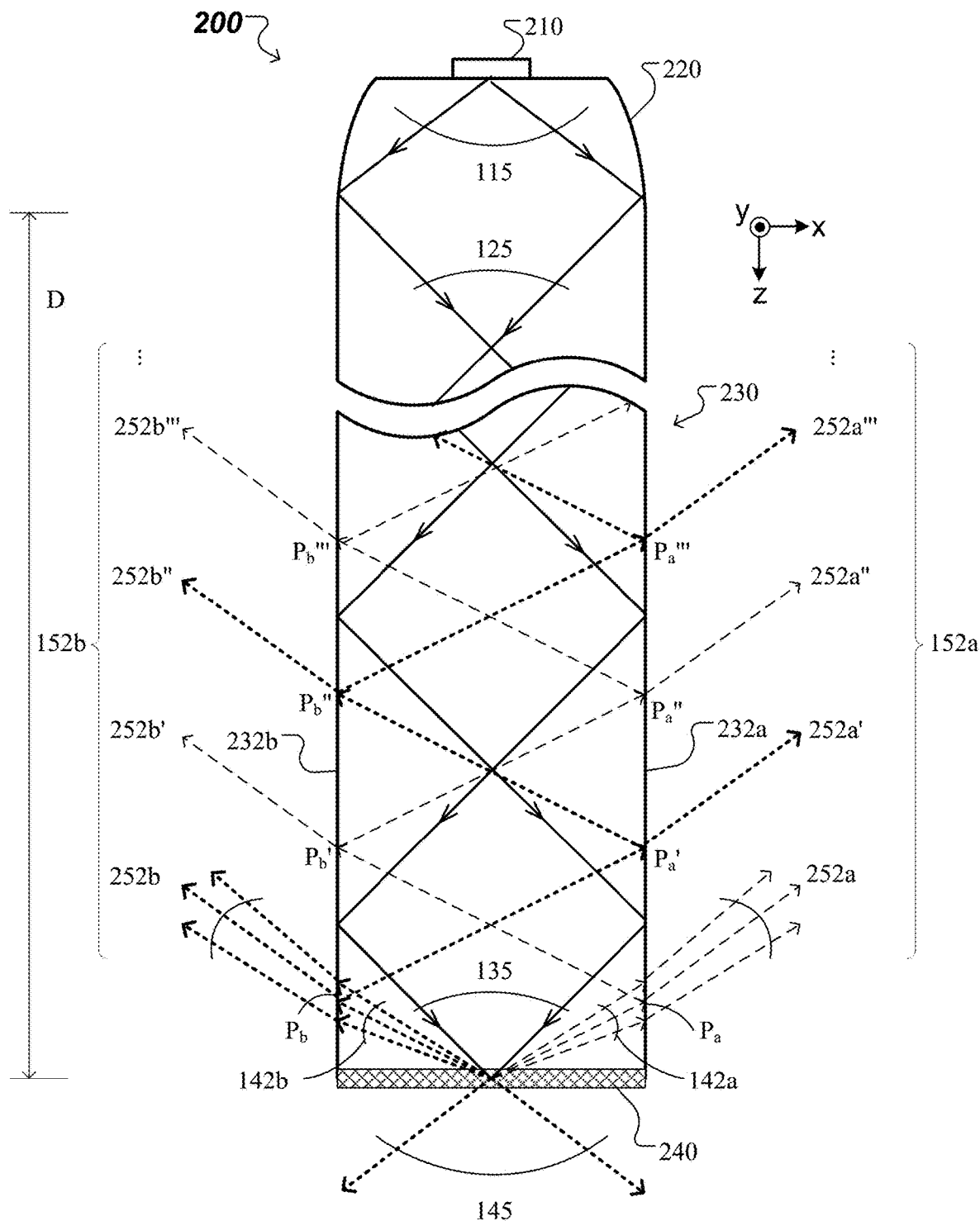
FIG. 2 illustrates aspects of the luminaire module of FIG. 1.

FIG. 2 illustrates a schematic x-z sectional view of a solid-state luminaire 200 that includes a light guide 230 with a redirecting end-face 240. In this example, the luminaire 200 also includes one or more LEEs 210 and corresponding one or more couplers 220. In some implementations, the luminaire 200 has an elongated configuration, e.g., with a longitudinal dimension L along the y-axis, perpendicular to the page, as illustrated in FIG. 1B. In this case, L can be 1', 2' or 4', for instance. In other implementations, the luminaire 200 has another elongated configuration, as illustrated in FIG. 1D. In some other implementations, the luminaire 200 has a non-elongated configuration, e.g., with rotational symmetry around the z-axis, as illustrated in FIG. 1C.

The light guide 230 has a finite length, D>0 along the z-axis, e.g., D=10, 20, 50 cm, from a receiving end to an opposing end. A thickness "t" of the light guide 230 along the x-axis can be much smaller than the length D along the z-axis, e.g., t 5% D, 10% D or 20% D. The light guide 230 is made from a solid, transparent material. Here, light guide side surfaces 232a, 232b are optically smooth to allow for the guided light to propagate inside the light guide 230 through TIR.

Moreover, the light guide 230 has a redirecting end-face 240 at the opposing end. The redirecting end-face 240 of the light guide reflects at least some of the guided light—that reaches the opposite end—back into the light guide 230 as return light. The redirecting end-face 240 is configured to generate return light that can transmit at least in part through the light guide side surfaces 232a and/or 232b. Furthermore, the light guide 230 is configured to allow multiple bounces of return light off of the light guide side surfaces 232a, 232b, with at least some transmission at one or more bounces. In some implementations, the guided light that reaches the opposite end of the light guide and is not reflected back into the light guide 230 as return light is transmitted through the redirecting end-face 240 in the forward direction (e.g., along the z-axis.) For example, reflectivity of a coating applied on the redirecting end-face 240 determines relative intensities of return light and the light transmitted through the redirecting end-face 240 in the forward direction. As another example, a density of apertures in the redirecting end-face 240 determines relative intensities of the return light and the light transmitted through the redirecting end-face 240 in the forward direction.

The redirecting end-face 240 has a macro-, meso- and/or microscopic surface structure configured such that the return light propagates backwards through the light guide 230 only along rays that impinge on the light guide side surfaces 232a, 232b at angles smaller than a critical incident angle. In this manner, TIR is avoided for the return light at the light guide side surfaces 232a, 232b. As such, the return light can transmit through the light guide side surfaces 232a, 232b at each of the multiple bounces thereof, except for about 4% Fresnel reflection at each of the bounces. Moreover, although light received by the light guide 230 from the one or more couplers 220 is guided forward to the opposing end within a TIR solid angle, the light guide 230 is configured to output as much of the return light through light guide side surfaces 232a and/or 232b. Little or none of the return light is guided by the light guide 230 from the opposing end back to the receiving end. Examples of surface structures of the redirecting end-face 240 that cause the return light to propagate through the light guide 230 and transmit through the side surfaces 232a and/or 232b are described below in connection with FIGS. 3A-3D and 4A-4D. In some implementations, an asymmetry of the output light in angular ranges 152a and 152b may be the result of asymmetric shapes of the surfaces 132a and 132b, asymmetry in the end face 240 and/or a reflective coating (not illustrated) on one of the surfaces 132a and 132b, for example.

During operation, the LEEs 210 provide light within a first angular range 115 relative to the z-axis. The one or more couplers 220 are configured to receive the light from the LEEs 210 within the first angular range 115 and provide light within a second angular range 125 to the light guide 230. The one or more couplers 220 can be configured to transform the first angular range 115 into the second angular range 125 via total internal reflection, specular reflection or both. Here, the divergence of the second angular range 125 is smaller than the divergence of the first angular range 115, such that the combination (i) of the second angular range 125 and (ii) a numerical aperture of the light guide 230 is chosen to allow for the light received from the one or more couplers 220 at the receiving end of the light guide 230 to propagate to the opposing end of the light guide 230, for example, via TIR.

In this manner, light received by the light guide 230 at the receiving end from the one or more couplers 220 in the second angular range 125 is guided forward (along the z-axis) by the light guide 230 from its receiving end to its opposing end. At the opposing end, the forward guided light has a third angular range 135. In some implementations, the third angular range 135 is substantially the same as the second angular range 125. Further at the opposing end, the forward guided light impinges on the redirecting end-face 240 where at least a portion of it is reflected back into the light guide 230 as return light.

The surface structure of the redirecting end-face 240 is configured to cause the return light to propagate only in return angular range 142a or 124b, or both. Here, substantially all return light within each of the return angular ranges 142a and 142b propagates only along rays that impinge on the respective light guide side surfaces 232a and 232b at angles smaller than a critical incident angle. In this manner, the return light in return angular ranges 142a, 142b can transmit through the light guide side surfaces 232a and 232b as output light of the luminaire module 200 in first and second output angular ranges 152a, 152b. Notably, the surface structure of the redirecting end-face 240 may need to be configured such that no return light propagates within an angular range that is an inverse of the third angular range 135, because such return light may be guided back towards the receiving end via TIR, and then not contribute to the output light of the luminaire module 200 and cause other effects.

Moreover, a fraction of the forward guided light that impinges on the redirecting end-face 240 and is not reflected back into the light guide 230 as return light is transmitted through the redirecting end-face 240 in the forward direction (e.g., along the z-axis) as output light in a third output angular range 145. In some implementations, e.g., in cases when the redirecting end-face 240 includes apertures or transparent portions of coating, the third output angular range 145 is substantially the same as the third angular range 135 of the guided light that reaches the opposing end of the light guide 230.

Various embodiments of the redirecting end-face 240 are now described along with corresponding intensity distributions of the light output by the luminaire module 200 when equipped with the described redirecting end-face 240.

Embodiments of the redirecting end-face 240 with surface structure that causes the return light to propagate in both return angular ranges 142a and 142b are described first. In these embodiments, the surface structure includes one or more symmetric v-grooves or a symmetric sawtooth pattern. Here, walls of the symmetric sawtooth pattern can be planar or curved.

Figures 3A, 3B:
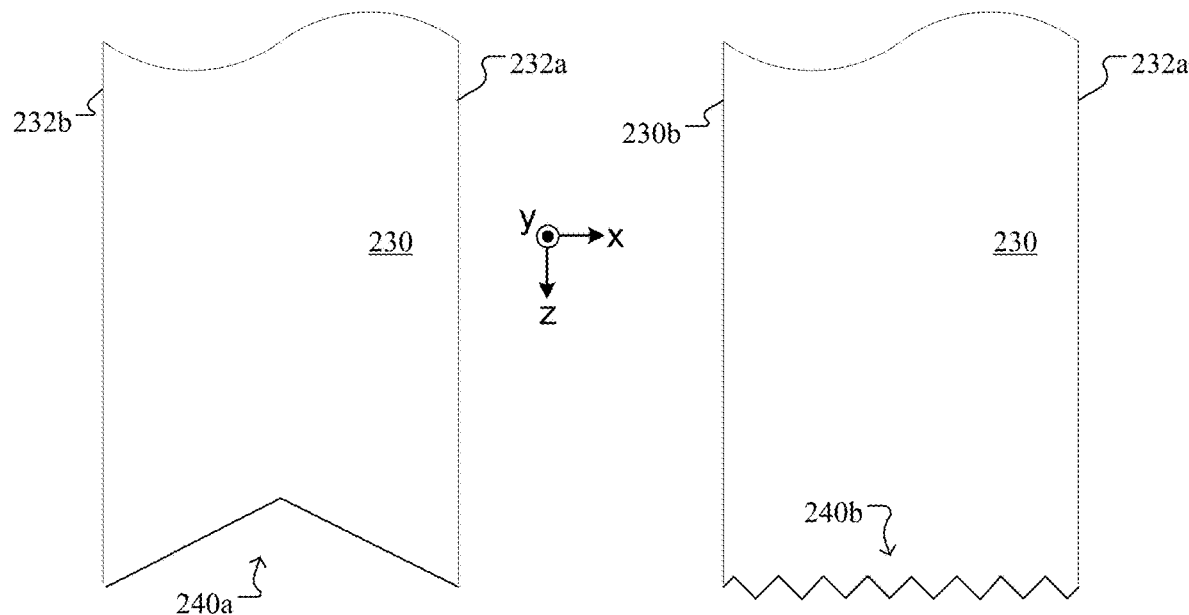
FIGS. 3A-3D illustrate embodiments of the redirecting end-face of the light guide of the luminaire module illustrated in FIG. 2.

FIG. 3A shows an implementation 240a of the redirecting end-face. Here, the redirecting end-face 240a has two planar portions intersecting at an apex. An angle between one of the planar portions and the z-axis is chosen such that substantially all return light reflected off the one of the planar portions of the redirecting end-face 240a propagates only along rays that impinge on the light guide side surface 232a at angles smaller than a critical incident angle. Another angle between the other one of the planar portions and the z-axis is chosen such that substantially all return light reflected off the other one of the planar portions of the redirecting end-face 240a propagates only along rays that impinge on the light guide side surface 232b at angles smaller than the critical incident angle. In this case, a divergence of the return light in each of the return angular ranges 142a, 142b is substantially the same as a divergence of the impinging guided light in the third angular range 135. Further in this case, a relative amount of the return light in the return angular ranges 142a, 142b can be varied by laterally displacing the apex formed by the two planar portions of the redirecting end-face 240a with respect to a center axis of the light guide 230.

FIG. 3B shows another implementation 240b of the redirecting end-face. Here, the redirecting end-face 240b has multiple pairs of planar portions, each of the pairs of planar portions intersecting at an associated apex. An angle between one planar portion of each of the pairs of planar portions and the z-axis is chosen such that substantially all return light reflected off the one planar portion propagates only along rays that impinge on the light guide side surface 232a at angles smaller than a critical incident angle. Another angle between the other planar portion of each of the planar portions and the z-axis is chosen such that substantially all return light reflected off the other planar portion propagates only along rays that impinge on the light guide side surface 232b at angles smaller than the critical incident angle. In this case, a divergence of the return light in each of the return angular ranges 142a, 142b is substantially the same as a divergence of the impinging guided light in the third angular range 135. Further in this case, a relative amount of the return light in the return angular ranges 142a, 142b can be varied by varying relative areas of the two planar portions of each pair of planar portions.

Figures 3C, 3D:
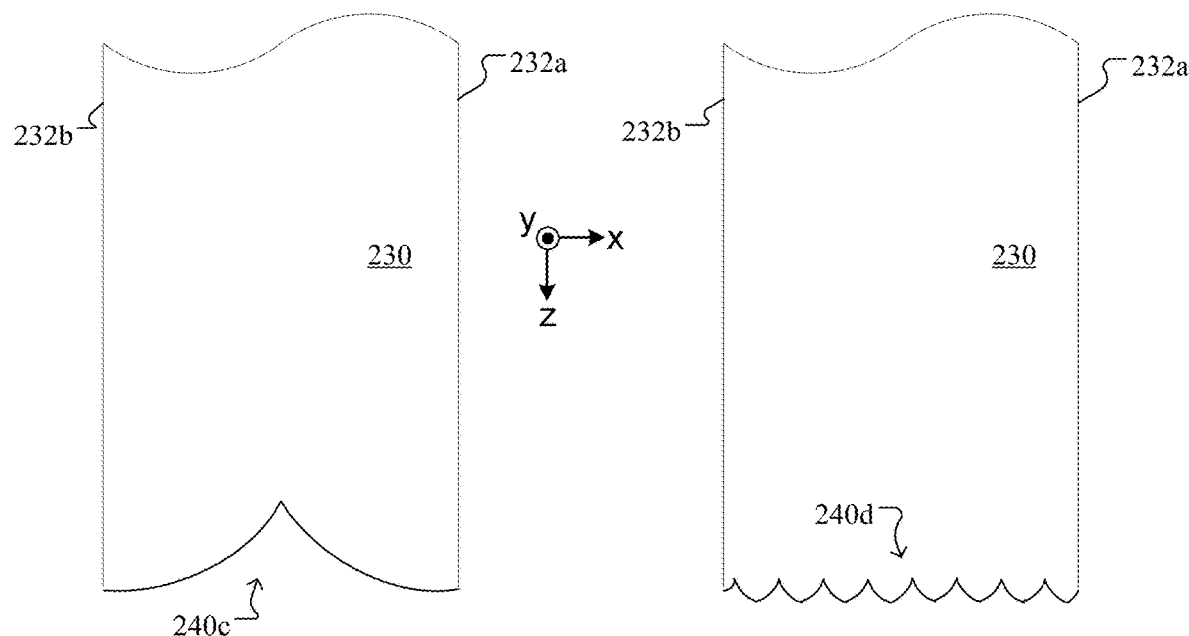

FIG. 3C shows an implementation 240c of the redirecting end-face. Here, the redirecting end-face 240c has two curved portions intersecting at an apex. The curved portions can be shaped as portions of a parabola, hyperbola, or other curves. An orientation of one of the curved portions relative the z-axis is chosen such that substantially all return light reflected off the one of the curved portions of the redirecting end-face 240c propagates only along rays that impinge on the light guide side surface 232a at angles smaller than a critical incident angle. Another orientation of the other one of the curved portions relative the z-axis is chosen such that substantially all return light reflected off the other one of the curved portions of the redirecting end-face 240c propagates only along rays that impinge on the light guide side surface 232b at angles smaller than the critical incident angle. In this case, respective divergences of the return light in the return angular ranges 142a, 142b are smaller/larger than a divergence of the impinging guided light in the third angular range 135 if the two curved portions are concave/convex. Further in this case, a relative amount of the return light in the return angular ranges 142a, 142b can be varied by laterally displacing the apex formed by the two curved portions of the redirecting end-face 240c with respect to a center axis of the light guide 230.

FIG. 3D shows another implementation 240d of the redirecting end-face. Here, the redirecting end-face 240d has multiple pairs of curved portions, each of the pairs of curved portions intersecting at an associated apex. The curved portions can be shaped as portions of a parabola, hyperbola, or other curves. An orientation of one curved portion of each of the pairs of curved portions relative the z-axis is chosen such that substantially all return light reflected off the one curved portion propagates only along rays that impinge on the light guide side surface 232a at angles smaller than a critical incident angle. Another orientation of the other curved portion of each of the curved portions relative the z-axis is chosen such that substantially all return light reflected off the other curved portion propagates only along rays that impinge on the light guide side surface 232b at angles smaller than the critical incident angle. In this case, respective divergences of the return light in the return angular ranges 142a, 142b are smaller/larger than a divergence of the impinging guided light in the third angular range 135 if the two curved portions of each of the pairs of curved portions are concave/convex. Further in this case, a relative amount of the return light in the return angular ranges 142a, 142b can be varied by varying relative areas of the two curved portions of each pair of curved portions.

Referring again to FIG. 2, return light generated by reflection off of any one of redirecting end-faces 240a, 240b, 240c or 240d in the first return angular range 142a impinges on the light guide side surface 232a at point $P_a$ and (most of it, e.g., about 96%) transmits through the light guide side surface 232a as output light in a first instance of first side angular range 252a. A prevalent propagation direction within the first instance of the first side angular range 252a can be (i) orthogonal to the light guide side surface 232a when a prevalent propagation direction within the first return angular range 142a is normal to the light guide side surface 232a; (ii) along the light guide side surface 232a (antiparallel to the z-axis) when the prevalent propagation direction within the first return angular range 142a is along a ray that impinges on the light guide side surface 232a at critical angle incidence; and (iii) anywhere in-between normal on the light guide side surface 232a (perpendicular to the z-axis) and parallel to the light guide side surface 232a (antiparallel to the z-axis) when the prevalent propagation direction within the first return angular range 142a is along a ray that impinges on the light guide side surface 232a between normal and critical angle incidence.

Return light generated by reflection off of any one of redirecting end-faces 240a, 240b, 240c or 240d in the second return angular range 142b impinges on the light guide side surface 232b at point $P_b$ and (most of it, e.g., about 96%) transmits through the light guide side surface 232b as output light in a first instance of second side angular range 252b. A prevalent propagation direction within the first instance of the second side angular range 252b can be (i) orthogonal to the light guide side surface 232b when a prevalent propagation direction within the second return angular range 142b is normal to the light guide side surface 232b; (ii) along the light guide side surface 232b (antiparallel to the z-axis) when the prevalent propagation direction within the second return angular range 142b is along a ray that impinges on the light guide side surface 232b at critical angle incidence; and (iii) anywhere in-between normal on the light guide side surface 232b (perpendicular to the z-axis) and parallel to the light guide side surface 232b (antiparallel to the z-axis) when the prevalent propagation direction within the second return angular range 142b is along a ray that impinges on the light guide side surface 232b between normal and critical angle incidence.

Further, a fraction (e.g., about 4%) of the return light in the first return angular range 142a that impinges on the light guide side surface 232a at point $P_a$ reflects (e.g., through Fresnel reflection) off of it and propagates towards the opposing light guide side surface 232b. Here, most of the return light (e.g., about 96%) impinging on the light guide side surface 232b at point $P_b'$ transmits through it as output light in a second instance of the second side angular range 252b'. A prevalent propagation direction within the second instance of the second side angular range 252b' has mirror symmetry relative the z-axis to the prevalent propagation direction within the first instance of the first side angular range 252a and a divergence of the second instance of the second side angular range 252b' is about the same as the divergence of the first instance of the first side angular range 252a. A fraction (e.g., about 4%) of the return light in the second return angular range 142b that impinges on the light guide side surface 232b at point $P_b$ reflects (e.g., through Fresnel reflection) off of it and propagates towards the opposing light guide side surface 232a. Here, most of the return light (e.g., about 96%) impinging on the light guide side surface 232a at point $P_a$ transmits through it as output light in a second instance of the first side angular range 252a'. A prevalent propagation direction within the second instance of the first side angular range 252a' has mirror symmetry relative the z-axis to the prevalent propagation direction within the first instance of the second side angular range 252b. And a divergence of the second instance of the first side angular range 252a' is about the same as the divergence of the first instance of the second side angular range 252b.

Furthermore, a fraction (e.g., about 4%) of the return light that impinges on the light guide side surface 232a at point $P_a$ reflects (e.g., through Fresnel reflection) off of it and propagates towards the opposing light guide side surface 232b. Here, most of the return light (e.g., about 96%) impinging on the light guide side surface 232b at point $P_b''$ transmits through it as output light in a third instance of the second side angular range 252b''. A prevalent propagation direction within the third instance of the second side angular range 252b'' is parallel to the prevalent propagation direction within the first instance of the second side angular range 252b. And a divergence of the third instance of the second side angular range 252b'' is about the same as the divergence of the first instance of the second side angular range 252b. A fraction (e.g., about 4%) of the return light that impinges on the light guide side surface 232b at point $P_b'$ reflects (e.g., through Fresnel reflection) off of it and propagates towards the opposing light guide side surface 232a. Here, most of the return light (e.g., about 96%) impinging on the light guide side surface 232a at point $P_a''$ transmits through it as output light in a third instance of the first side angular range 252a''. A prevalent propagation direction within the third instance of the first side angular range 252a'' is parallel to the prevalent propagation direction within the first instance of the first side angular range 252a. And a divergence of the third instance of the first side angular range 252a'' is about the same as the divergence of the first instance of the first side angular range 252a.

In addition, a fraction (e.g., about 4%) of the return light that impinges on the light guide side surface 232a at point $P_a''$ reflects (e.g., through Fresnel reflection) off of it and propagates towards the opposing light guide side surface 232b. Here, most of the return light (e.g., about 96%) impinging on the light guide side surface 232b at point $P_b'''$ transmits through it as output light in a fourth instance of the second side angular range 252r. A prevalent propagation direction within the fourth instance of the second side angular range 252b''' has mirror symmetry relative the z-axis to the prevalent propagation direction within the first instance of the first side angular range 252a. And a divergence of the fourth instance of the second side angular range 252b''' is about the same as the divergence of the first instance of the first side angular range 252a. A fraction (e.g., about 4%) of the return light that impinges on the light guide side surface 232b at point $P_b''$ reflects (e.g., through Fresnel reflection) off of it and propagates towards the opposing light guide side surface 232a. Here, most of the return light (e.g., about 96%) impinging on the light guide side surface 232a at point $P_a'''$ transmits through it as output light in a fourth instance of the first side angular range 252a''. A prevalent propagation direction within the fourth instance of the first side angular range 252a''' has mirror symmetry relative the z-axis to the prevalent propagation direction within the first instance of the second side angular range 252b and a divergence of the fourth instance of the first side angular range 252a''' is about the same as the divergence of the first instance of the second side angular range 252b.

Accordingly, additional bounces of the return light off the light guide side surfaces 232a and 232b are progressively weaker in intensity.

In this manner, light output by the luminaire module 200—equipped with anyone of the redirecting end-faces 240a, 240b, 240c or 240d—through the light guide side surface 232a in a resultant first output angular range 152a is a combination of light transmitted through the light guide side surface 232a in the first, second, third, fourth, etc., instances of the first side angular range 252a, 252a', 252a'', 252a''', etc. Similarly, light output by this implementation of the luminaire module 200 through the light guide side surface 232b in a resultant second output angular range 152b is a combination of light transmitted through the light guide side surface 232b in the first, second, third, fourth, etc., instances of the second side angular range 252b, 252b', 252b'', 252b''', etc.

Figure 3E:
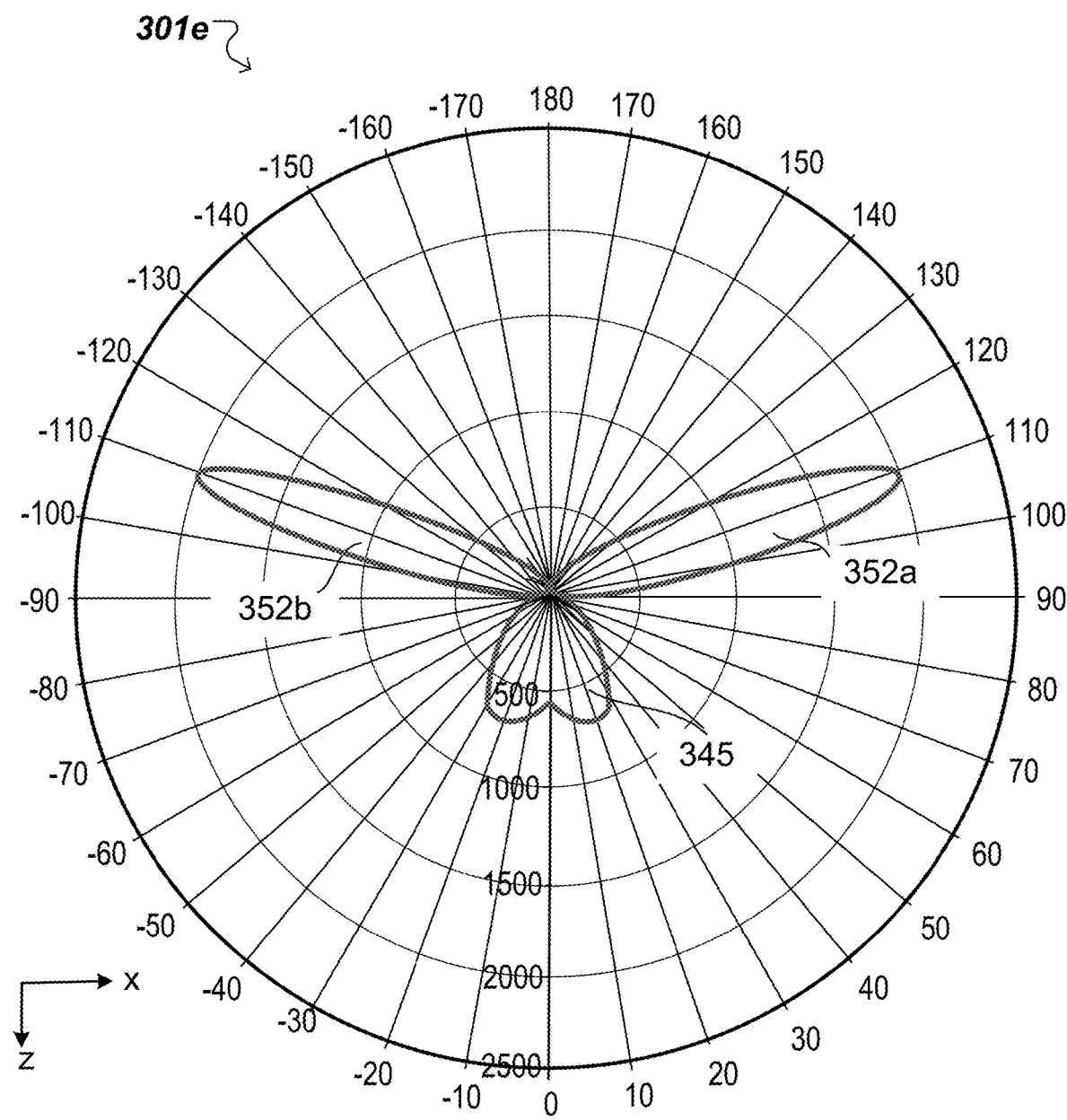
FIGS. 3E-3F illustrate light intensity distributions corresponding to the luminaire module of FIG. 2 having the light guide with the redirecting end-faces illustrated in FIGS. 3A-3D.

FIG. 3E shows a far-field intensity distribution 301e of light output by the luminaire module 200 in the x-z cross-section. Here, the luminaire module 200 is equipped with anyone of the redirecting end-faces 240a, 240b, 240c or 240d, and the redirecting end-face has a coating of semitransparent material or a reflecting coating that has apertures (or semitransparent) portions. Lobe 352a corresponds to output light transmitted through the light guide side surface 232a in the first output angular range 152a. Lobe 352b corresponds to output light transmitted through the light guide side surface 232b in the second output angular range 152b. Lobe 345 corresponds to output light transmitted through the redirecting end-face 240a, 240b, 240c or 240d in the third output angular range 145.

An orientation of the lobe 352a (e.g., with respect to the z-axis) and a shape of thereof (e.g., aspect ratio of the lobe 352a) depends mostly (e.g., more than 96%) on respective propagation direction and divergence of the return light in the first return angular range 142a (due to transmissions at points $P_a$, $P_a''$, etc.), and marginally (e.g., less than 4%) on respective propagation direction and divergence of the return light in the second return angular range 142b (due to transmissions at points $P_a$, $P_a'''$, etc.) Similarly, an orientation of the lobe 352b (e.g., with respect to the z-axis) and a shape of thereof (e.g., aspect ratio of the lobe 352b) depends mostly (e.g., more than 96%) on respective propagation direction and divergence of the return light in the second return angular range 142b (due to transmissions at points $P_b$, $P_b''$, etc.), and marginally (e.g., less than 4%) on respective propagation direction and divergence of the return light in the first return angular range 142b (due to transmissions at points $P_b'$, $P_b'''$, etc.) As described above, the propagation directions and divergences of the return light in the first and second return angular ranges 142a, 142b depend on the surface structure of each of embodiments 240a, 240b, 240c or 240d of the redirecting end-face. An orientation of the lobe 345 (e.g., with respect to the z-axis) and a shape of thereof (e.g., batwing) depend on (i) collimating characteristics of the one or more couplers 220, and (ii) guiding characteristics of the light guide 230. Relative sizes of the lobes 352a, 352b and 345 depend on a combination of (i) reflectance of a coating of the redirecting end-face, and (ii) surface structure of the embodiments 240a, 240b, 240c or 240d of the redirecting end-face.

Figure 3F:
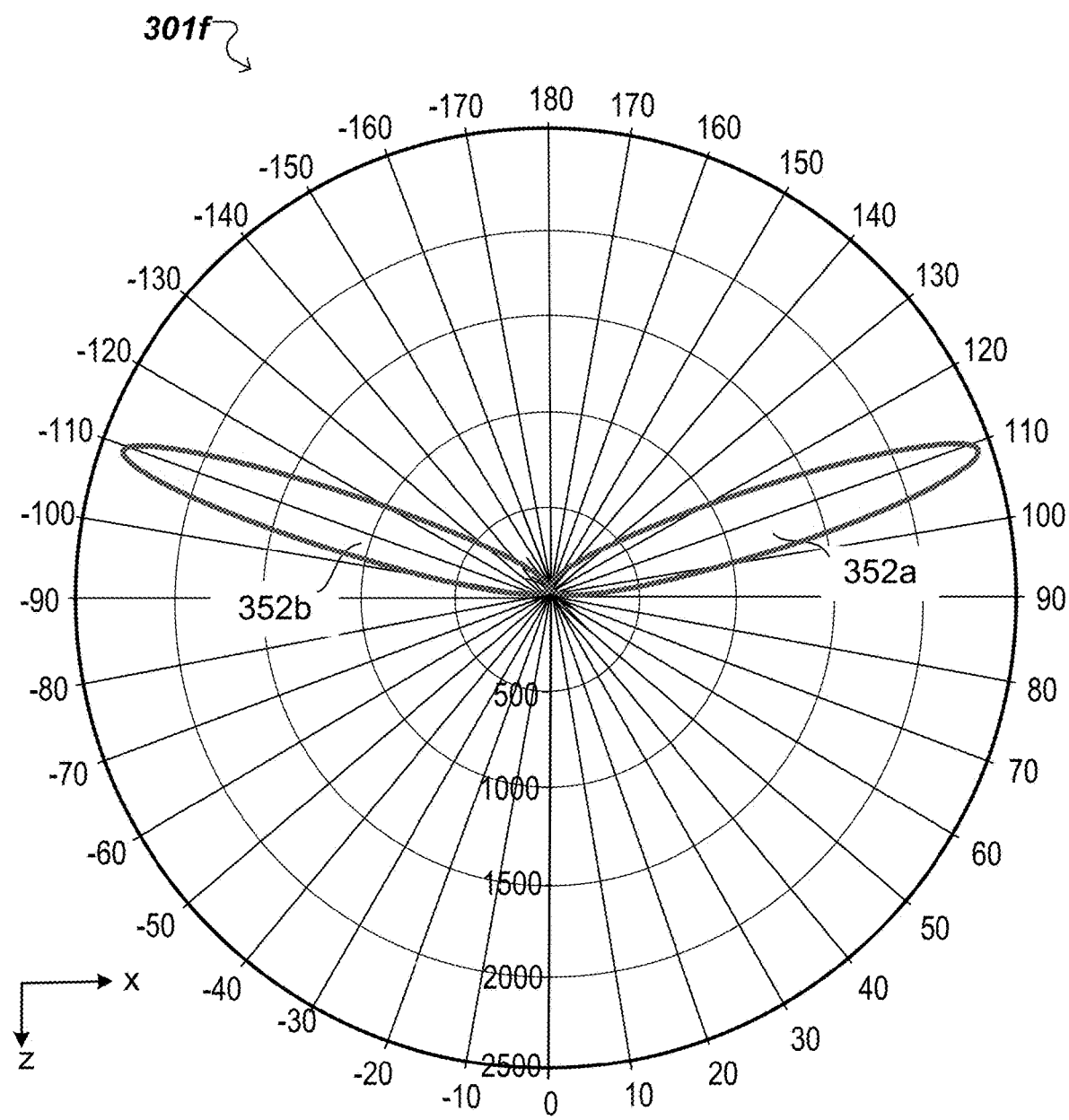

FIG. 3F shows an intensity distribution 301f of light output by the luminaire module 200 in the x-z cross-section. Here, the luminaire module 200 is equipped with anyone of the redirecting end-faces 240a, 240b, 240c or 240d, and the redirecting end-face has a reflecting coating (with reflectance up to about 99.9%, for instance.) Lobe 352a corresponds to output light transmitted through the light guide side surface 232a in the first output angular range 152a, and lobe 352b corresponds to output light transmitted through the light guide side surface 232b in the second output angular range 152b.

An orientation of the lobe 352a (e.g., with respect to the z-axis) and a shape of thereof (e.g., aspect ratio of the lobe 352a) depends mostly (e.g., more than 96%) on respective propagation direction and divergence of the return light in the first return angular range 142a (due to transmissions at points $P_a$, $P_a''$, etc.), and marginally (e.g., less than 4%) on respective propagation direction and divergence of the return light in the second return angular range 142b (due to transmissions at points $P_a$, $P_a'''$, etc.) Similarly, an orientation of the lobe 352b (e.g., with respect to the z-axis) and a shape of thereof (e.g., aspect ratio of the lobe 352b) depends mostly (e.g., more than 96%) on respective propagation direction and divergence of the return light in the second return angular range 142b (due to transmissions at points $P_b$, $P_b''$, etc.), and marginally (e.g., less than 4%) on respective propagation direction and divergence of the return light in the first return angular range 142b (due to transmissions at points $P_a$, $P_a'''$, etc.) As described above, the propagation directions and divergences of the return light in the first and second return angular ranges 142a, 142b depend on the surface structure of each of embodiments 240a, 240b, 240c or 240d of the redirecting end-face. Relative sizes of the lobes 352a and 352b depend on surface structure of the embodiments 240a, 240b, 240c or 240d of the redirecting end-face.

Embodiments of the redirecting end-face 240 with surface structure that causes the return light to propagate in both return angular ranges 142a and 142b along with corresponding intensity distributions of output light were described above. Embodiments of the redirecting end-face 240 with surface structure that causes the return light to propagate substantially in a single return angular range 142a along with corresponding intensity distributions of output light are described next. In these embodiments, the surface structure includes one or more asymmetric v-grooves or an asymmetric sawtooth pattern. Here, walls of the asymmetric sawtooth pattern can be planar or curved.

Figure 4A:
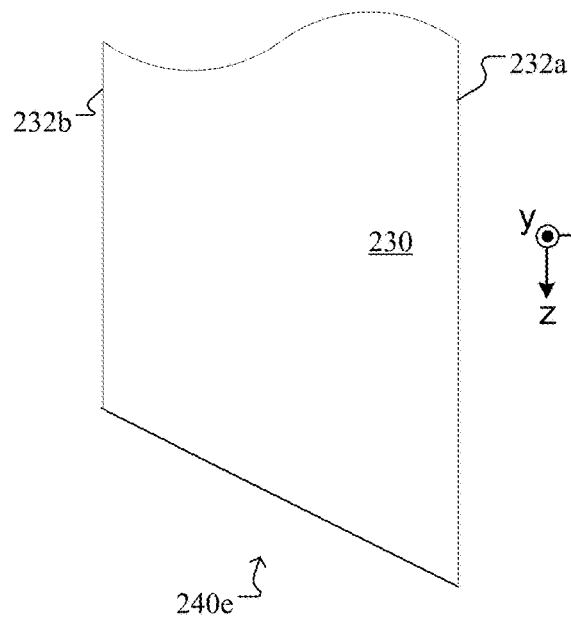
FIGS. 4A-4D illustrate other embodiments of the redirecting end-face of the light guide of the luminaire module illustrated in FIG. 2.

FIG. 4A shows an implementation 240e of the redirecting end-face. Here, the redirecting end-face 240e is planar and forms an angle relative the z-axis that is chosen such that substantially all return light reflected off the planar redirecting end-face 240e propagates only along rays that impinge on the light guide side surface 232a at angles smaller than a critical incident angle. In this case, a divergence of the return light in the return angular range 142a is substantially the same as a divergence of the impinging guided light in the third angular range 135.

Figure 4B:
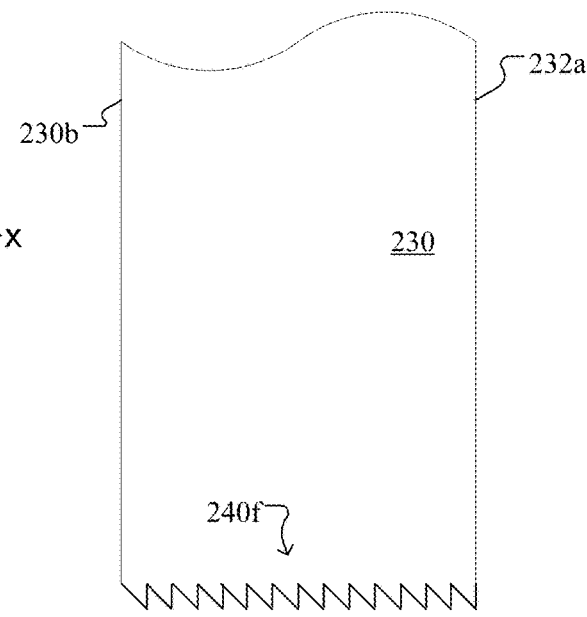

FIG. 4B shows another implementation 240f of the redirecting end-face. Here, the redirecting end-face 240f has multiple planar portions, each of the planar portions forms an angle relative the z-axis that is chosen such that substantially all return light reflected off each of the planar portions propagates only along rays that impinge on the light guide side surface 232a at angles smaller than a critical incident angle. In this case, a divergence of the return light in the return angular range 142a is substantially the same as a divergence of the impinging guided light in the third angular range 135.

Figure 4C:
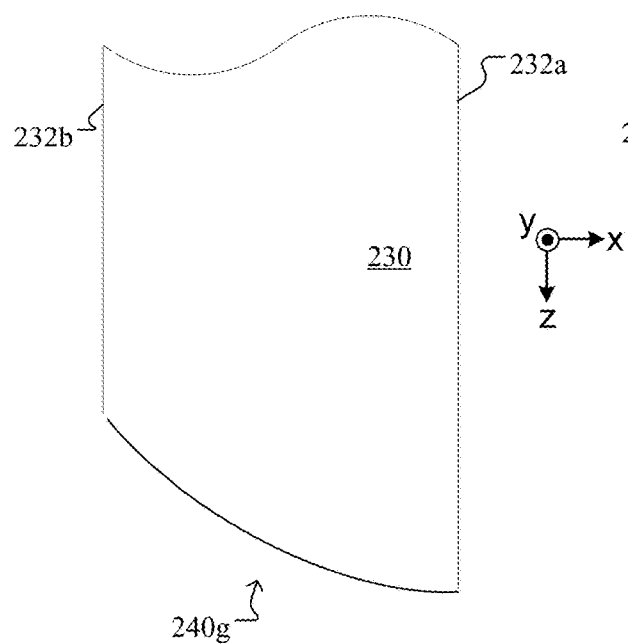

FIG. 4C shows an implementation 240g of the redirecting end-face. Here, the redirecting end-face 240g is curved and oriented relative the z-axis such that substantially all return light reflected off the curved redirecting end-face 240g propagates only along rays that impinge on the light guide side surface 232a at angles smaller than a critical incident angle. The curved redirecting end-face 240g can be shaped as a portion of a parabola, hyperbola, or other curves. In this case, respective a divergence of the return light in the return angular range 142a is smaller/larger than a divergence of the impinging guided light in the third angular range 135 if the curved redirecting end-face 240g is concave/convex.

Figure 4D:
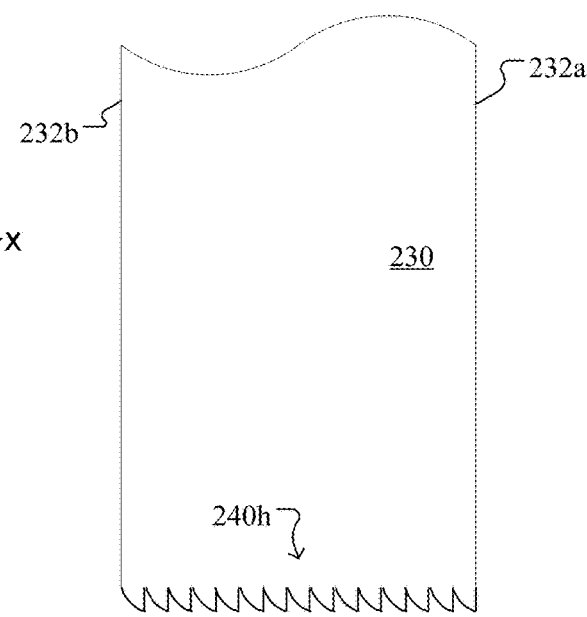

FIG. 4D shows another implementation 240h of the redirecting end-face. Here, the redirecting end-face 240h has multiple curved portions, each of the curved portions orientated such that substantially all return light reflected off each of the curved portions propagates only along rays that impinge on the light guide side surface 232a at angles smaller than a critical incident angle. The curved portions can be shaped as portions of a parabola, hyperbola, or other curves. In this case, a divergence of the return light in the return angular range 142a is smaller/larger than a divergence of the impinging guided light in the third angular range 135 if the curved portions are concave/convex.

Referring again to FIG. 2, return light generated by reflection off of any one of redirecting end-faces 240e, 240f, 240g or 240h in the first return angular range 142a impinges on the light guide side surface 232a at point $P_a$ and (most of it, e.g., about 96%) transmits through the light guide side surface 232a as output light in a first instance of first side angular range 252a. A prevalent propagation direction within the first instance of the first side angular range 252a can be (i) orthogonal to the light guide side surface 232a when a prevalent propagation direction within the first return angular range 142a is normal to the light guide side surface 232a; (ii) along the light guide side surface 232a (antiparallel to the z-axis) when the prevalent propagation direction within the first return angular range 142a is along a ray that impinges on the light guide side surface 232a at critical angle incidence; and (iii) anywhere in-between normal on the light guide side surface 232a (perpendicular to the z-axis) and parallel to the light guide side surface 232a (antiparallel to the z-axis) when the prevalent propagation direction within the first return angular range 142a is along a ray that impinges on the light guide side surface 232a between normal and critical angle incidence.

Further, a fraction (e.g., about 4%) of the return light in the first return angular range 142a that impinges on the light guide side surface 232a at point $P_a$ reflects (e.g., through Fresnel reflection) off of it and propagates towards the opposing light guide side surface 232b. Here, most of the return light (e.g., about 96%) impinging on the light guide side surface 232b at point $P_b'$ transmits through it as output light in a first instance of a second side angular range 252b'. A prevalent propagation direction within the first instance of the second side angular range 252b' has mirror symmetry relative the z-axis to the prevalent propagation direction within the first instance of the first side angular range 252a. And a divergence of the first instance of the second side angular range 252b' is about the same as the divergence of the first instance of the first side angular range 252a.

Furthermore, a fraction (e.g., about 4%) of the return light that impinges on the light guide side surface 232b at point $P_b'$ reflects (e.g., through Fresnel reflection) off of it and propagates towards the opposing light guide side surface 232a. Here, most of the return light (e.g., about 96%) impinging on the light guide side surface 232a at point $P_a''$ transmits through it as output light in a second instance of the first side angular range 252a''. A prevalent propagation direction within the second instance of the first side angular range 252a'' is parallel to the prevalent propagation direction within the first instance of the first side angular range 252a and a divergence of the second instance of the first side angular range 252a'' is about the same as the divergence of the first instance of the first side angular range 252a.

In addition, a fraction (e.g., about 4%) of the return light that impinges on the light guide side surface 232a at point $P_a''$ reflects (e.g., through Fresnel reflection) off of it and propagates towards the opposing light guide side surface 232b. Here, most of the return light (e.g., about 96%) impinging on the light guide side surface 232b at point $P_b'''$ transmits through it as output light in a second instance of the second side angular range 252b'''. A prevalent propagation direction within the second instance of the second side angular range 252b''' has mirror symmetry relative the z-axis to the prevalent propagation direction within the first instance of the first side angular range 252a. And a divergence of the second instance of the second side angular range 252b''' is about the same as the divergence of the first instance of the first side angular range 252a.

Accordingly, additional bounces of the return light off the light guide side surfaces 232a and 232b are progressively weaker in intensity.

In this manner, light output by the luminaire module 200—equipped with anyone of the redirecting end-faces 240e, 240f, 240g or 240h—through the light guide side surface 232a in a resultant first output angular range 152a is a combination of light transmitted through the light guide side surface 232a in the first, second, etc., instances of the first side angular range 252a, 252a'', etc. Similarly, light output by this implementation of the luminaire module 200 through the light guide side surface 232b in a resultant second output angular range 152b is a combination of light transmitted through the light guide side surface 232b in the first, second, etc., instances of the second side angular range 252b', 252b''', etc.

Figure 4E:
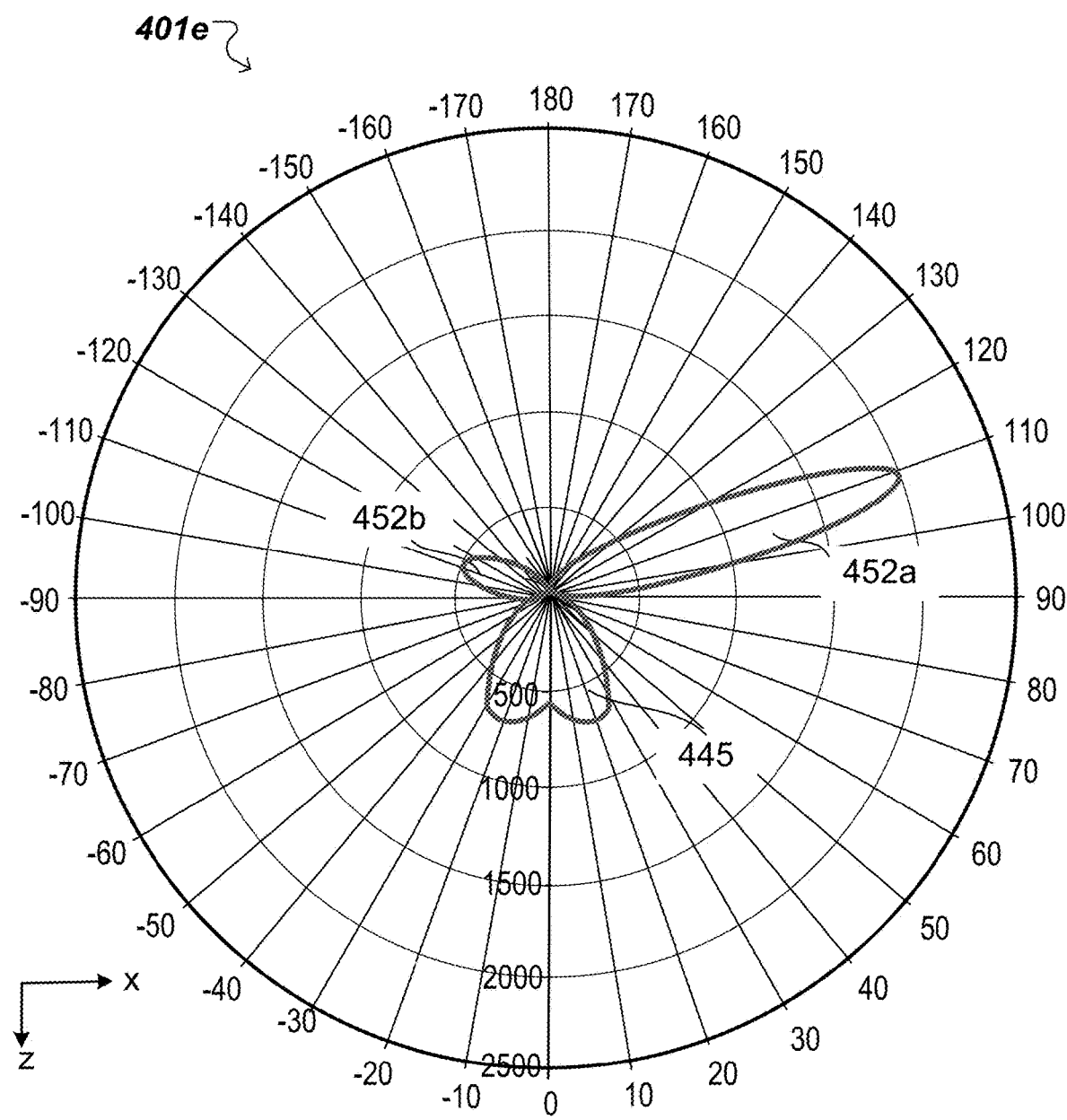
FIGS. 4E-4F illustrate light intensity distributions corresponding to the luminaire module of FIG. 2 having the light guide with the redirecting end-faces illustrated in FIGS. 4A-4D.

FIG. 4E shows an intensity distribution 401e of light output by the luminaire module 200 in the x-z cross-section. Here, the luminaire module 200 is equipped with anyone of the redirecting end-faces 240e, 240f, 240g or 240h, and the redirecting end-face has a coating of semitransparent material or a reflecting coating that has apertures (or semitransparent) portions. Lobe 452a corresponds to output light transmitted through the light guide side surface 232a in the first output angular range 152a. Lobe 452b corresponds to output light transmitted through the light guide side surface 232b in the second output angular range 152b. Lobe 445 corresponds to output light transmitted through the redirecting end-face 240e, 240f, 240g or 240h in the third output angular range 145.

An orientation of the lobe 452a (e.g., with respect to the z-axis) and a shape of thereof (e.g., aspect ratio of the lobe 452a) depends on respective propagation direction and divergence of the return light in the first return angular range 142a (due to transmissions at points $P_a$, $P_a''$, etc.) Similarly, an orientation of the lobe 452b (e.g., with respect to the z-axis) and a shape of thereof (e.g., aspect ratio of the lobe 452b) also depends on respective propagation direction and divergence of the return light in the first return angular range 142a (due to transmissions at points $P_b'$, $P_b'''$, etc.). As described above, the propagation directions and divergences of the return light in the first return angular range 142a depend on the surface structure of each of embodiments 240e, 240f, 240g or 240h of the redirecting end-face. An orientation of the lobe 445 (e.g., with respect to the z-axis) and a shape of thereof (e.g., batwing) depend on (i) collimating characteristics of the one or more couplers 220, and (ii) guiding characteristics of the light guide 230. Size of the combination of the lobes 452a and 452b relative to the size of the lobe 445 depends on reflectance of a coating of the redirecting end-face. Further, a ratio of sizes of the lobes 452a and 452b can be about 96% to 4%.

Figure 4F:
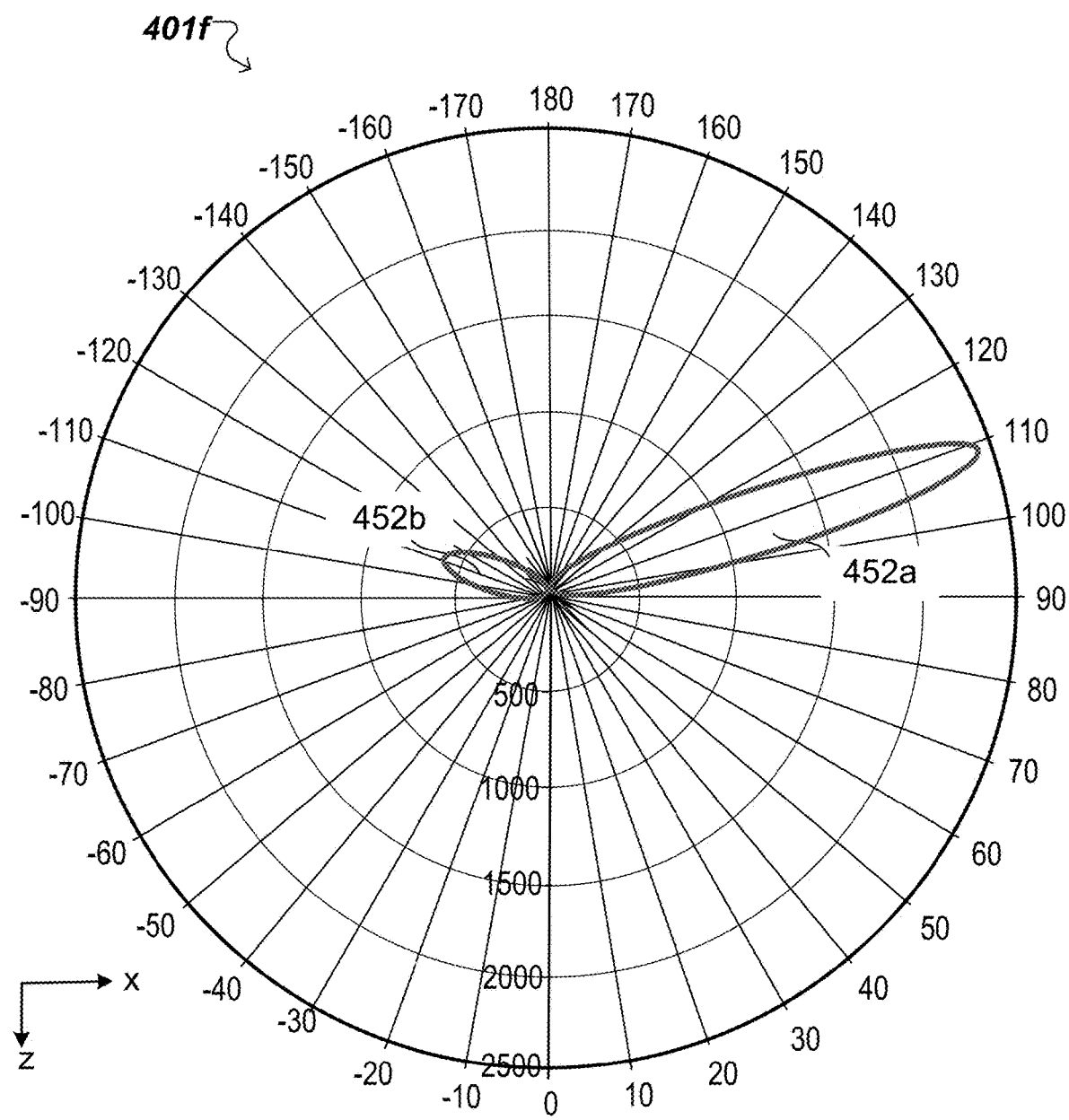

FIG. 4F shows an intensity distribution 401f of light output by the luminaire module 200 in the x-z cross-section. Here, the luminaire module 200 is equipped with anyone of the redirecting end-faces 240e, 240f, 240g or 240h, and the redirecting end-face has a reflecting coating (with reflectance higher than 99.9%, for instance.) Lobe 452a corresponds to output light transmitted through the light guide side surface 232a in the first output angular range 152a, and lobe 452b corresponds to output light transmitted through the light guide side surface 232b in the second output angular range 152b.

An orientation of the lobe 452a (e.g., with respect to the z-axis) and a shape of thereof (e.g., aspect ratio of the lobe 452a) depends on respective propagation direction and divergence of the return light in the first return angular range 142a (due to transmissions at points $P_a$, $P_a''$, etc.) Similarly, an orientation of the lobe 452b (e.g., with respect to the z-axis) and a shape of thereof (e.g., aspect ratio of the lobe 452b) also depends on respective propagation direction and divergence of the return light in the first return angular range 142a (due to transmissions at points $P_b'$, $P_b'''$, etc.). As described above, the propagation directions and divergences of the return light in the first return angular range 142a depend on the surface structure of each of embodiments 240e, 240f, 240g or 240h of the redirecting end-face. A ratio of sizes of the lobes 452a and 452b is about 96%:4%. In some implementations, a portion of surface 232a or one of surfaces 232a or 232b may be partially or fully coated with a reflective layer. Such luminaire modules may exhibit enhanced asymmetry between the sizes of lobes 452a and 452b. For example, a full reflective coating on surface 232b can completely suppress lobe 452b.

In general, illumination devices (e.g., luminaire modules 100 or 200) described in this specification are configured to use light flux originating from a primary source (LEEs 110 or 210) of known dimensional, geometric, brightness and uniformity characteristics, and additional reflector/refractor/combination optics to output a specified radiation pattern. The additional optics redistribute the source flux's "phase-space" to a new phase-space of prescribed dimensional extent and angular divergence (e.g., directional cosines) while maintaining a substantially uniform intensity from the additional optics. These illumination devices can provide uniform illumination of the work surface, efficient energy conversion from the light source of the devices to the work surface, and uniform and/or glare-free intensity from the fixture itself when viewed from the work surface. Additionally, these devices can provide glare-free intensity characteristics while maintaining efficiency and directionality in flux redirection.

Depending on the embodiment, two or more of the one or more optical couplers 120/220 and light guide 130/230 of any of the luminaire modules 100 or 200 described above can be modularly configured. Modularly configured components of the disclosed luminaires 100 and 200 include or are configured for operative interconnection with suitably formed interconnection elements configured to facilitate registration, assembly and/or disassembly during manufacture, field servicing, or resurfacing, for example. Integral formation of two or more optical components of the disclosed luminaires, for example the optical couplers 120/220 and the light guide 130/230, can be employed to maintain Fresnel losses that may otherwise occur at optical interfaces at or below predetermined levels. Integral formation can facilitate registration and alignment of respective components of a luminaire.

Components of the disclosed luminaires 100 and 200 can be formed from commodity plastics and/or sheet metals. As such, the foregoing components can undergo extrusion, casting, molding, bending and/or other processes.

For instance, the LEEs 110/210 can be placed on a carrier (e.g., elongated along the y-axis) made from extruded aluminum, such that the carrier not only supports the LEEs 110 but also has extended cooling surfaces to provide heat dissipation during operation.

In some implementations, the optical couplers 120/220 and the light guide 130/230 are fabricated from transparent plastics and have a full cross-section. Such optical components are referred to as solid optics. In some cases, the optical couplers 120/220 and the light guide 130/230 are integrally formed. In other implementations, the optical couplers 120/220 are fabricated from or have coatings of reflective materials such as Al, Ag, and have hollow cross-section. The latter optical components are referred to as hollow optics.

In some implementations, the surface structure of the redirecting end-face 140/240 can be molded or machined. The machining/micro-machining can be performed using mechanical/micro-mechanical tools and/or lasers. Reflecting or semi-transparent coatings are applied onto the surface structure of the redirecting end-face 140/240 as necessary.

Unless defined otherwise, all technical and scientific terms used herein have the same meaning as commonly understood by one of ordinary skill in the art to which this technology belongs.

The invention claimed is:

1. A luminaire module comprising:
one or more light-emitting elements (LEEs) arranged to provide light; and
a light guide comprising:
a receiving end and an opposing end, the receiving end arranged to receive the light provided by the LEEs;
a pair of opposing side surfaces extending along a length of the light guide between the receiving end and the opposing end, the light guide configured to guide the received light about a forward direction via reflection of the light at the pair of opposing side surfaces, along the length of the light guide to the opposing end of the light guide; and
a redirecting end-face located at the opposing end, the redirecting end-face comprising surface structure that includes one or more pairs of planar or curved portions configured to reflect the guided light incident on the redirecting end-face back into the light guide as return light, the planar or curved portions being arranged such that substantially all the return light impinges on at least one of the pair of opposing side surfaces at incident angles less than a critical angle allowing transmission of the return light from the light guide into the ambient as output light of the luminaire module, the output light to propagate in backward directions including obtuse angles relative to the forward direction,
wherein the guided light that reaches the opposing end propagates in directions entirely different from directions of propagation of the return light,
wherein substantially all the return light is transmitted into the ambient during multiple bounces at the pair of opposing side surfaces, and
wherein at least one of the opposing side surfaces is a non-planar, curved surface.

2. The luminaire module of claim 1, wherein the light guide is configured to guide the received light in a forward direction through total internal reflection (TIR) off the opposing side surfaces.

3. The luminaire module of claim 1, wherein
the light provided by the LEEs is in a first angular range, and
a numerical aperture of the light guide is such that the light received from the LEEs in the first angular range can be guided by the light guide through TIR off the pair of opposing side surfaces.

4. The luminaire module of claim 1 further comprising one or more optical couplers, wherein
the light provided by the LEEs is in a first angular range,
the optical couplers are arranged to receive the light provided by the LEEs and redirect it to the receiving end of the light guide in a second angular range, and
a numerical aperture of the light guide is such that the light received from the optical couplers in the second angular range can be guided by the light guide through TIR off the pair of opposing side surfaces.

5. The luminaire module of claim 1, wherein the return light transmits through each of the pair of opposing side surfaces as output light in a first output angular range with a propagation direction having a component anti-parallel to the forward direction.

6. The luminaire module of claim 1, wherein the redirecting end-face comprises one or more sawtooth-shaped sections.

7. The luminaire module of claim 6, wherein the sawtooth-shaped sections are symmetrical.

8. The luminaire module of claim 1, wherein the redirecting end-face is coated with reflecting material.

9. The luminaire module of claim 8, wherein the reflecting material has voids that allow light to transmit through the end-face.

10. The luminaire module of claim 1, wherein both of the opposing side surfaces are non-planar, curved surfaces.

11. The luminaire module of claim 1, wherein the non-planar, curved surface is curved in a first plane perpendicular to the forward direction.

12. The luminaire module of claim 11, wherein the non-planar, curved surface is a convex surface.

13. The luminaire module of claim 12, wherein the convex surface defines an elliptical arc in the first plane.

14. The luminaire module of claim 11, wherein the non-planar, curved surface is a concave surface.

15. The luminaire module of claim 14, wherein the concave surface defines an elliptical arc in the first plane.

16. The luminaire module of claim 11, wherein one of the opposing surfaces is a convex surface and the other opposing surface is a concave surface.

17. The luminaire module of claim 1, wherein the non-planar, curved surface is a cylindrical surface, wherein a cylindrical axis defined by the cylindrical surface corresponds to the forward direction.

18. The luminaire module of claim 1, wherein the light guide is shaped as a cylindrical shell.

19. The luminaire module of claim 18, wherein the cylindrical shell is an oval cylindrical shell.

20. The luminaire module of claim 1, wherein the pair of opposing side surfaces are parallel along the length of the light guide.

21. The luminaire module of claim 1, wherein the surface structure comprises multiple pairs of curved portions.

22. The luminaire module for claim 1, wherein each of the curved portions is shaped as at least a portion of a parabola or a hyperbola.

23. The luminaire module for claim 1, wherein the surface structure comprises multiple pairs of planar portions, wherein each pair of planar portions comprises:
    a first planar portion extending parallel to the forward direction, and
    a second planar portion extending a direction that is angled relative to the forward direction.

24. The luminaire module for claim 1, wherein the surface structure comprises multiple pairs of planar and curved portions, wherein each pair of planar and curved portions comprises:
    a first planar portion extending parallel to the forward direction, and
    a second curved portion shaped as at least a portion of a parabola or a hyperbola.

* * * * *